US012592450B2

(12) United States Patent
  Lahr et al.

(10) Patent No.: US 12,592,450 B2
(45) Date of Patent: Mar. 31, 2026

(54) BATTERY SYSTEM WITH DIVERTER ASSEMBLY FOR THERMAL PROPAGATION PROTECTION

(71) Applicant: GM GLOBAL TECHNOLOGY OPERATIONS LLC, Detroit, MI (US)

(72) Inventors: Derek F. Lahr, Howell, MI (US); Xiaoling Chen, Sterling Heights, MI (US); Ryan P. Hickey, Austin, TX (US); Diptak Bhattacharya, Royal Oak, MI (US); David R. Clark, Grosse Pointe Woods, MI (US); Aaron Sussman, Keego Harbor, MI (US); Andrew C. Bobel, Troy, MI (US); Frances Remi Villalonga, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 291 days.

(21) Appl. No.: 18/530,279

(22) Filed: Dec. 6, 2023

(65) Prior Publication Data

US 2025/0192350 A1     Jun. 12, 2025

(51) Int. Cl.
  *H01M 50/367* (2021.01)
  *B60L 15/00* (2006.01)
  (Continued)

(52) U.S. Cl.
  CPC ......... *H01M 50/358* (2021.01); *B60L 15/007* (2013.01); *B60L 50/64* (2019.02);
  (Continued)

(58) Field of Classification Search
  CPC ............. H01M 50/358; H01M 50/209; H01M 50/271; H01M 50/3425; H01M 2220/20;
  (Continued)

(56) References Cited

U.S. PATENT DOCUMENTS 4,250,232 A * 2/1981 Davidson ............. H01M 50/114
                                                              429/56
2013/0095356 A1* 4/2013 Shimizu .............. H01M 50/519
                                                              429/88

FOREIGN PATENT DOCUMENTS

DE     102013201365 A1    7/2014
DE     102020113086 A1    11/2021
                      (Continued)

*Primary Examiner* — Justin Holmes
(74) *Attorney, Agent, or Firm* — Quinn IP Law

(57) ABSTRACT

A battery system for a motor vehicle or another electrical system includes a battery cover, one or more battery cells, and a diverter assembly. The cells define a battery cavity in fluid communication with a corresponding vent opening. An air gap may be defined in an exhaust volume within the battery system. The diverter assembly includes a diverter body arranged relative to the vent openings. The diverter body is moveable or stationary. In response to a thermal propagation event occurring in the module or at least one of the battery cells, each diverter body diverts a high-temperature flow of ejecta from the cavity into an exhaust volume in a predetermined flow direction when the flow of ejecta passes through the vent opening. The diverter assembly may include a support member connected to the diverter body and connectable to the battery cell.

20 Claims, 9 Drawing Sheets

(51) Int. Cl.

| | |
|---|---|
| *B60L 50/64* | (2019.01) |
| *H01M 50/209* | (2021.01) |
| *H01M 50/271* | (2021.01) |
| *H01M 50/342* | (2021.01) |
| *H01M 50/358* | (2021.01) |

(52) U.S. Cl.
  CPC ....... *H01M 50/209* (2021.01); *H01M 50/271* (2021.01); *H01M 50/3425* (2021.01); *H01M 2220/20* (2013.01)

(58) Field of Classification Search
  CPC ............. H01M 10/613; H01M 50/249; H01M 50/367; H01M 50/375; H01M 50/30; B60L 15/007; B60L 50/64; Y02E 60/10
  See application file for complete search history.

(56)                        References Cited

FOREIGN PATENT DOCUMENTS

| | | | | | |
|---|---|---|---|---|---|
| JP | 5704098 | B2 | * | 4/2015 | |
| JP | 2016062757 | A | | 4/2016 | |
| JP | 2023004828 | A | * | 1/2023 | ............ H01M 50/30 |
| WO | WO-2021228954 | A1 | * | 11/2021 | .......... H01M 50/367 |

* cited by examiner

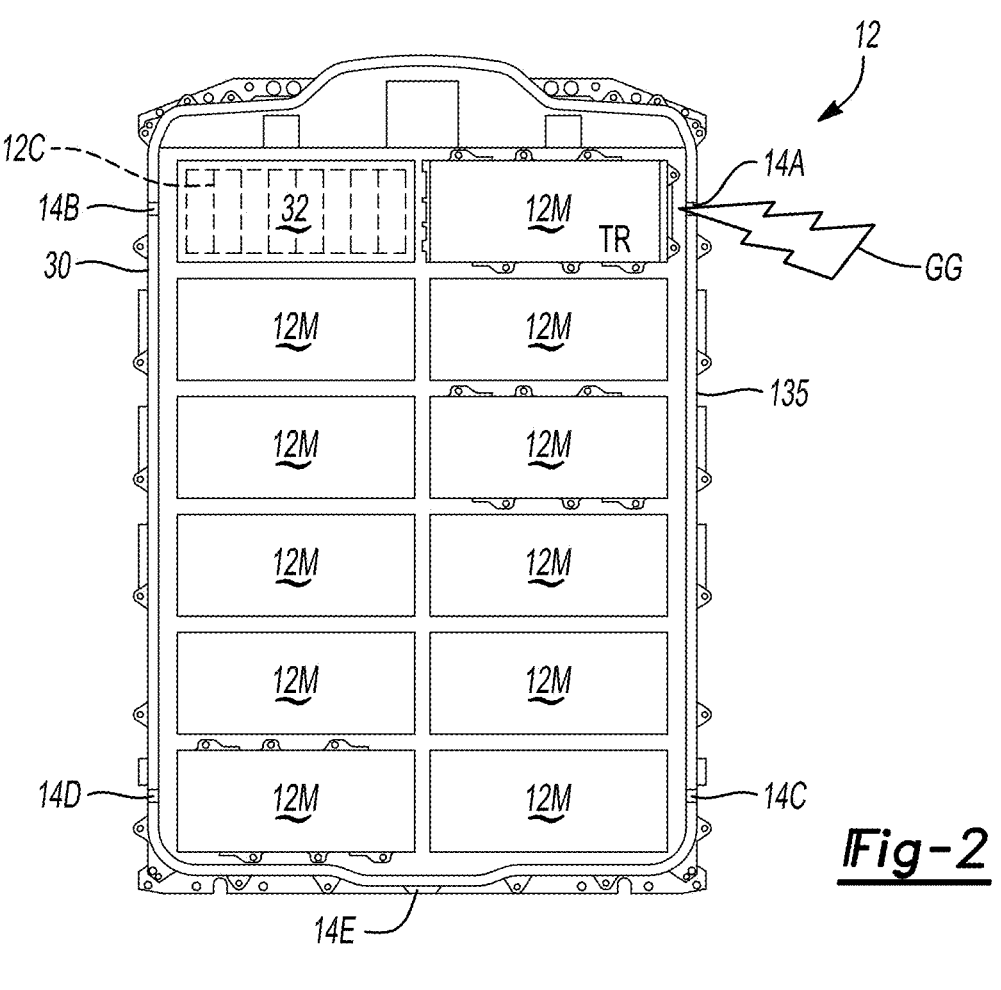
_Fig-2_
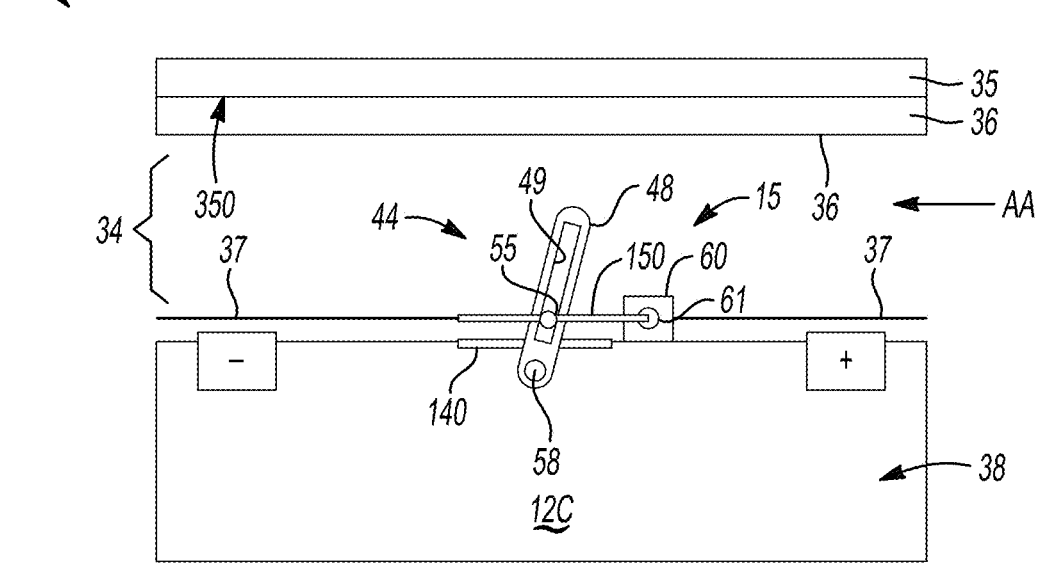
_Fig-3A_

BATTERY SYSTEM WITH DIVERTER ASSEMBLY FOR THERMAL PROPAGATION PROTECTION

INTRODUCTION

Electrochemical batteries and battery packs are used in a myriad of battery electric systems. Aboard an electric vehicle, for instance, a high-voltage propulsion battery pack is connected to a direct current (DC) voltage bus. The battery pack includes an application-specific number of cylindrical, prismatic, or pouch-style electrochemical battery cells. The DC voltage bus, when energized by discharge of the battery pack, powers one or more electric traction motors and associated power electronic components. The same DC voltage bus may conduct a charging current to constituent battery cells of the battery pack during battery charging modes.

Propulsion battery packs suitable for use with electric vehicles and other high-voltage battery electric systems typically utilize a lithium-based or nickel-based battery chemistry. In lithium-ion battery cells in particular, the movement of electrons and lithium ions produces electricity for powering the above-noted electric traction motor(s). Charging and discharging of the battery cells is accompanied by a discharge of waste heat. The generated waste heat is dissipated from the battery cells during normal operation of the battery pack by an onboard thermal management system, e.g., using circulated battery coolant, cooling plates, or fans. Under rare conditions, factors such as battery cell damage, age, and environmental degradation may lead to heat generation in a given battery cell or battery module at a rate exceeding the cooling capability of the onboard thermal management system. The uncontrolled release of thermal energy from the battery cell or module may be exacerbated by thermal propagation to neighboring battery cells/modules.

SUMMARY

Disclosed herein is a battery system having one or more battery modules. Each battery module contains an application-specific number of electrochemical battery cells, with the present solutions being readily applied to above-noted prismatic and cylindrical cells in particular. Each battery module and/or respective battery cell thereof defines corresponding vent opening for exhausting hot gases, particulate, and molten matter, collectively referred to herein as ejecta, during a thermal propagation event. A respective vent cover is disposed within each of the vent openings, with the vent cover being configured to open in response to the temperature-elevated pressure in the battery module or cell indicative of an active thermal propagation event occurring therewithin. When the vent cover bursts or otherwise opens during the thermal propagation event, the ejecta from the particular battery cell or module experiencing the thermal propagation event is quickly released through the now-open vent opening and into an available exhaust volume within the battery system, e.g., a space, channel, or other defined area suitable for receiving the ejecta.

In accordance with aspects of the present disclosure, the battery module and/or each of the battery cells is equipped with a diverter assembly operable for steering, deflecting, or otherwise diverting the ejecta in a controlled direction into the exhaust volume. The diverter assembly may be disposed within the exhaust volume directly opposite a corresponding one of the vent openings. Benefits of the present construction include a corresponding reduction in incident heat as the ejecta impinges on components disposed directly opposite the vent opening, e.g., other battery cells, a battery pack cover, or other proximate structure such as sheet metal, plumbing, electrical wiring, etc. Embodiments of the diverter assembly as contemplated herein also facilitate entrainment of relatively cold air in the battery pack with the diverted ejecta flow, with various moveable and fixed solutions for implementing the diverter assembly described in detail below.

In a particular non-limiting construction, a battery system includes a battery housing having a battery cover, one or more battery modules, and one or more diverter assemblies. Each battery module contains one or more battery cells therein. The battery housing and/or each respective one of the battery cells defines a respective vent opening and a respective battery cavity in fluid communication therewith. An exhaust volume defined within or in proximity to the one or more battery modules may in turn define an air gap, e.g., between the battery cover and the battery module in one or more implementations.

Additionally, the battery system includes a diverter assembly arranged relative to the vent opening. The diverter assembly includes one or more diverter bodies each configured, in response to a thermal propagation event occurring in the battery module or battery cell(s), to divert ejecta from the battery cavity into the exhaust volume. Diversion of the ejecta occurs in a particular flow direction when the ejecta passes through the vent opening, e.g., in a single direction or a split direction in different implementations.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 2 is a plan view illustration of a representative embodiment of a propulsion battery pack of the battery system shown in FIG. 1.

FIGS. 3A and 3B together illustrate an embodiment of a prismatic battery cell equipped with a moveable diverter assembly in accordance with a possible construction.

Figure 1:
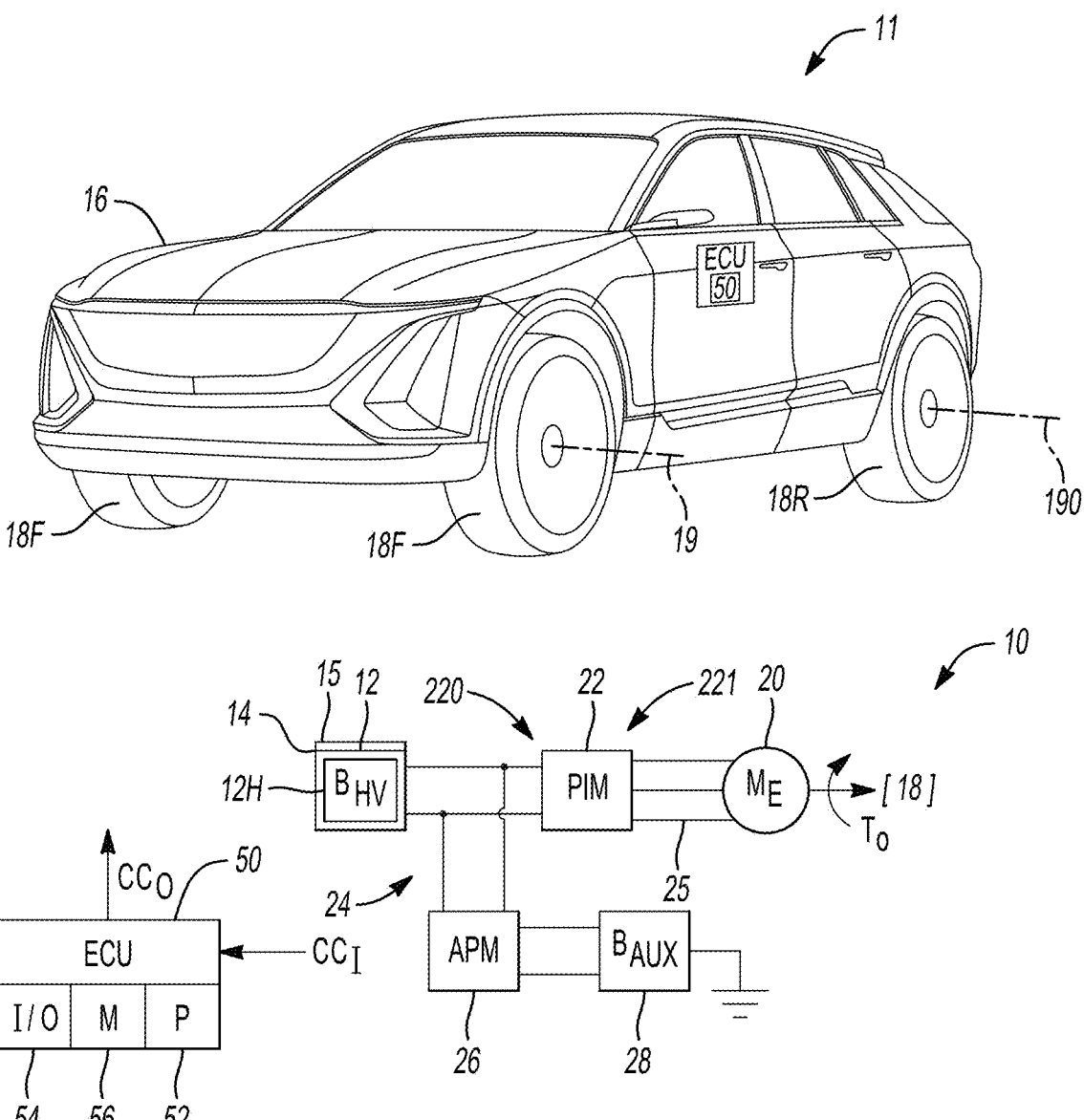
FIG. 1 is an exemplary motor vehicle equipped with a battery system, with the battery system having one or more module or cell vents and corresponding diverter assemblies for mitigating thermal effects of a thermal propagation event in accordance with the disclosure.

The appended drawings are not necessarily to scale, and may present a somewhat simplified representation of various features of the present disclosure, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

As appreciated by those skilled in the art, battery packs of battery electric vehicles, electrified powertrain systems, and other battery electric systems are often equipped with thermal vent openings through which high-temperature gases, particulate, and molten material—collectively "ejecta"—are expelled during a thermal propagation event. In order to seal the vent opening prior to the thermal propagation event, a pressure-sensitive membrane or sacrificial vent cover may span the vent opening. The vent cover opens when a differential pressure across the vent cover exceeds a predetermined burst threshold, e.g., about 20-25 kilopascals (kPa). The ejecta is thus rapidly expelled through the exposed vent opening. Module-level venting may be performed in conjunction with cell-level venting for a collection of connected battery cells using perimeter vents. Therefore, the present teachings may be applied at the battery cell level and/or the battery module level without limitation.

Referring to the drawings, wherein like reference numbers refer to like features throughout the several views, FIG. 1 depicts an electrified powertrain system 10 having a battery system (B$_{HV}$) 12. The battery system 12 includes a battery housing 12H, e.g., a solid outer case. The battery system 12 includes multiple vent openings 14, e.g., circular or rectangular through-openings, each of the vent openings 14 being equipped with a corresponding vent cover 140 (see FIGS. 3A and 3B). As shown in FIG. 2, the battery system 12 may be constructed from an application-suitable number of battery modules 12M each containing therein one more electrochemical battery cells 12C. The battery modules 12M and/or the individual battery cells 12C may likewise include a corresponding vent opening 14 and associated vent cover 140 in accordance with one or more of the disclosed embodiments set forth below with reference to FIGS. 3A-10.

In accordance with the present disclosure, the battery system 12 of FIG. 1 is also equipped with one or more diverter assemblies 15. The diverter assemblies 15, which are arranged relative to the vent opening(s) 14, are configured to function in a particular manner in response to a thermal propagation event occurring in the battery system 12, e.g., in one or more of the battery modules 12M or one or more of the battery cells 12C of FIG. 2. Specifically, the diverter assemblies 15 divert a resulting outflow of high-temperature gases, particulate, and molten material, collectively referred to hereinbelow as "ejecta", in predetermined flow direction when a flow of ejecta (arrow GG) is expelled through the vent opening(s) 14. FIGS. 3A-10 illustrate various hardware solutions for constructing the diverter assemblies 15 and integrating the same into the battery system 12.

In a representative use case, the electrified powertrain system 10 of FIG. 1 may be used as part of a motor vehicle 11 or another mobile electric system. As shown, the motor vehicle 11 may be embodied as a battery electric vehicle, with the present teachings also being extendable to plug-in hybrid electric vehicles. Alternatively, the electrified powertrain system 10 may be used as part of another mobile system such as but not limited to a rail vehicle, aircraft, marine vessel, robot, farm equipment, etc. Likewise, the electrified powertrain system 10 may be stationary, such as in the case of a powerplant, hoist, drive belt, or conveyor system. Therefore, the electrified powertrain system 10 in the representative vehicular embodiment of FIG. 1 is intended to be illustrative of the present teachings and not limiting thereof.

The motor vehicle 11 shown in FIG. 1 includes a vehicle body 16 and road wheels 18F and 18R, with "F" and "R" indicating the respective front and rear positions. The road wheels 18F and 18R rotate about respective axes 19 and 190, with the road wheels 18F, the road wheels 18R, or both being powered by output torque (arrow T$_O$) from an electric traction motor (M$_E$) 20 of the electrified powertrain system 10 as indicated by arrow [18]. While one electric traction motor 20 is illustrated for simplicity, more than one electric traction motor 20 may be used in other implementations. The road wheels 18F and 18R represent a mechanical load in this particular embodiment, with other possible mechanical loads being possible in different host systems.

The electrified powertrain system 10 may also include a power inverter module (PIM) 22 which, as with the battery system 12, is arranged on a high-voltage direct current (DC) voltage bus 24. As appreciated in the art, the PIM 22 is a semiconductor-based power inverter circuit, and thus includes a DC side 220 and an alternating current (AC) side 221, with the AC side 221 being connected to individual phase windings (not shown) of the electric traction motor 20 when constructed as a single phase or polyphase machine.

Since the battery system 12 of FIG. 1 is connected to the DC side 220 of the PIM 22, a battery voltage supplied from the battery system 12 to the DC voltage bus 24 is delivered to the PIM 22 during propulsion modes of the motor vehicle 11. The PIM 22, or more precisely a set of semiconductor power switches (not shown) residing therein, are controlled via pulse width modulation, pulse density modulation, or other suitable switching control techniques to invert a DC input voltage on the DC voltage bus 24 into an AC output voltage suitable for energizing a high-voltage AC voltage bus 25. High-speed switching of the resident semiconductor switches of the PIM 22 ultimately energizes the electric traction motor 20 to thereby cause the electric traction motor 20 to generate and deliver the output torque (arrow T$_O$) to one or more of the road wheels 18F and/or 18R in the non-limiting embodiment of FIG. 1, or to another coupled mechanical load in other implementations.

Electrical components of the electrified powertrain system 10 may also include an accessory power module (APM) 26 and an auxiliary battery (B$_{AUX}$) 28. The APM 26 is configured as a DC-DC converter that is connected to the DC voltage bus 24. In operation, the APM 26 is capable, via internal switching and voltage transformation, of reducing a voltage level on the DC voltage bus 24 to a lower level suitable for charging the auxiliary battery 28 and/or supplying low-voltage power to one or more accessories (not shown) such as lights, displays, etc. Thus, the term "high-voltage" as used herein may encompass voltage levels in excess of typical 12-15V low/auxiliary voltage levels, with 400V or more being an exemplary high-voltage level in some embodiments of the battery system 12.

Still referring to FIG. 1, the electrified powertrain system 10 may also include an electronic control unit (ECU) 50. The ECU 50, shown as a single ECU 50 for illustrative simplicity but possibly embodied as multiple networked ECUs 50, is operable for regulating ongoing operation of the electrified powertrain system 10 via transmission of electronic control signals (arrow CC$_O$). The ECU 50 does so in response to electronic input signals (arrow CC$_I$). Such input signals (arrow CC$_I$) may be actively communicated or passively detected in different embodiments, such that the ECU 50 is operable for determining a particular mode of operation. The ECU 50 controls operation of the electrified powertrain system 10, possibly including control actions associated with mitigating effects of a thermal propagation event of the battery system 12, e.g., alerting an operator of the motor vehicle 11 as to appropriate steps to take depending on vehicle occupancy, location, operating state, transmitting an alert signal to a remote source such as a maintenance depot or first responder, etc.

To this end, each ECU 50 is equipped with one or more processors (P) 52, e.g., logic circuits, combinational logic circuit(s), Application Specific Integrated Circuit(s) (ASIC), electronic circuit(s), central processing unit(s), semiconductor IC devices, etc., as well as input/output (I/O) circuit(s) 54, appropriate signal conditioning and buffer circuitry, and other components such as a high-speed clock to provide the described functionality. The ECU 50 also includes an associated computer-readable storage medium, i.e., memory (M) 56 inclusive of read only, programmable read only, random access, a hard drive, etc., whether resident, remote or a combination of both. Control routines are executed by the processor 52 to monitor relevant inputs from sensing devices and other networked control modules (not shown), and to execute control and diagnostic routines to govern operation of the electrified powertrain system 10.

Referring briefly again to FIG. 2, the battery system 12 may include a propulsion battery pack, also referred to as a traction battery pack, configured for use onboard the motor vehicle 11 of FIG. 1 in a non-limiting embodiment. The battery system 12 may include a battery tray 30 that is connectable to the housing 12H of FIG. 1, with a portion of the housing 12H omitted from FIG. 2 for illustrative clarity. A plurality of the above-noted battery modules 12M may be disposed on the battery tray 30 and encapsulated within the housing 12H when the housing 12H is securely fastened to the battery tray 30.

Although certain internal details of the battery modules 12M are omitted for illustrative simplicity, those skilled in the art will appreciate that the battery modules 12M contain therein an application-specific number of the battery cells 12C, with a typical embodiment as described herein being prismatic or cylindrical lithium-ion battery cells. A lithium-ion embodiment of the battery cell 12C is generally composed of a solid or liquid electrolyte material, one or more pair of working electrodes, and a permeable separator, which are collectively enclosed inside an electrically-insulated can or prismatic shell. Grouped battery cells 12C may be connected in series or parallel through use of an electrical interconnect board 32 (see FIGS. 5A and 5B) and related voltage buses, sensing hardware, and power electronics. While twelve battery modules 12M are depicted in the non-limiting construction of FIG. 2, more or fewer battery modules 12M may be used in other configurations.

Figure 3B:
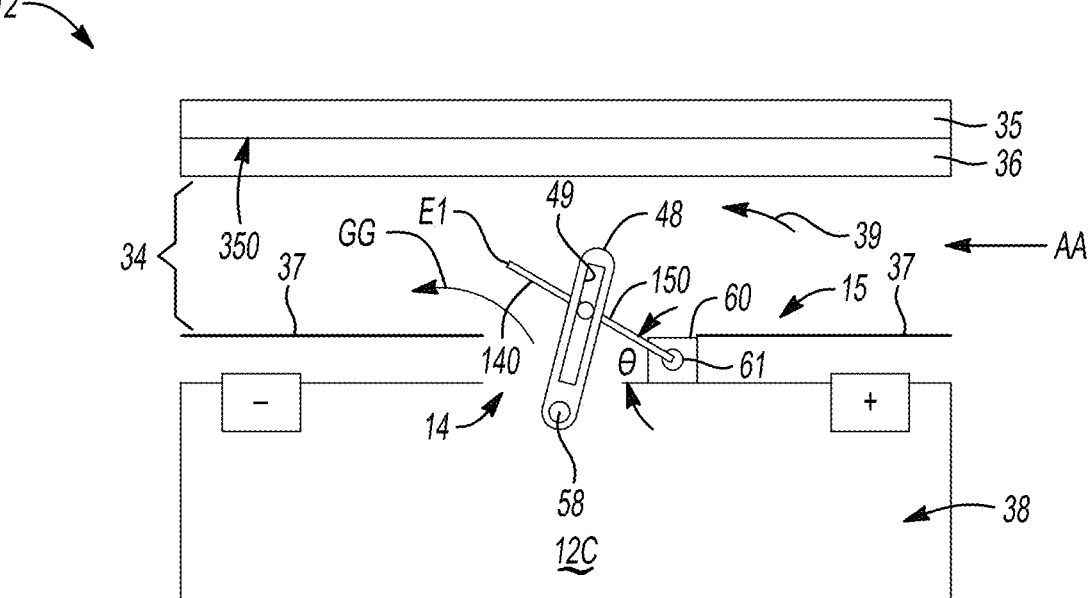

As noted above, the housing 12H is connectable to the battery tray 30 in a possible construction to enclose the battery modules 12M therebetween. Clearance between the battery modules 12M and the housing 12H, e.g., a battery cover 35 thereof as shown in FIGS. 3A and 3B or other structure of or located within the housing 12H, thus forms part of a defined exhaust volume 34 (see FIG. 3A), with a vent channel 83 of the exhaust volume 34 illustrated in FIG. 10. The housing 12H in a representative rectilinear configuration may include side walls 135. Each of the side walls 135 may define one or more of the above-noted vent openings 14, e.g., for module-level venting. For example, the vent openings 14 shown schematically in FIG. 1 may include representative perimeter module vent openings 14A, 14B, 14C, 14D, and 14E, as well as cell-level applications of the vent openings 14 disposed on each of the individual battery cells 12C contained therein. This enables pack-level, module-level, and cell-level venting of the flow of ejecta (arrow GG) from a during a thermal propagation event.

During a typical thermal propagation event, the temperature within an affected one of the battery modules 12M or battery cells 12C thereof will rapidly increase. In FIG. 2, such a battery module 12M is labeled "TR" for clarity. As the internal temperature rises, internal structure of the battery modules 12M and battery cells 12C experiencing the thermal propagation event may melt, burn, or otherwise degrade. This process produces various gases and possible molten materials and particulate matter as a byproduct, with such materials collectively referred to as ejecta as noted above, and with movement of the flow of ejecta (arrow GG) through the battery system 12 referred to herein as ejecta flow. For instance, an electrolyte solution of a lithium-ion cell includes a lithium salt dissolved in an organic solvent decomposes from heat during the thermal propagation event to produce carbon dioxide, carbon monoxide, and other gaseous combustion byproducts.

As appreciated by those skilled in the art, a temperature of the flow of ejecta (arrow GG) may temporarily approach or exceed 1000° Celsius. The increasing temperature within the battery module 12M or battery cell(s) 12C experiencing thermal propagation increases the internal pressure. Thus, the vent openings 14, sealed by a corresponding vent cover 140 such as the above-described membrane, a solid metal cover, or a sacrificial cover are configured to open corresponding vent openings 14 in response to a threshold pressure within the battery cavity 38 as noted above. As a result, the flow of ejecta (arrow GG) is discharged to the surrounding ambient through the vent openings 140. The diverter assemblies 15 are constructed to temporarily withstand such elevated temperatures until the thermal propagation event is controlled and the temperature within the battery system 12 subsides. As with the particular number of battery modules 12M used in a given construction of the battery system 12, the number and relative position of the various vent openings 14 may vary with the intended application, and thus the five perimeter module vent openings 14A, 14B, 14C, 14D, and 14E of FIG. 2 are non-limiting and illustrative of the present teachings.

Referring now to FIGS. 3A and 3B, a portion of a representative battery cell 12C of the battery system 12 of FIGS. 1 and 2 is shown in a simplified side view illustration in accordance with a possible construction. As noted above, the battery system 12 in this particular embodiment includes the above-noted battery cover 35, an undersurface 350 of which is coated or attached to a thermal insulating layer 350 such as mica. The battery system 12 may include one or more battery modules 12M (see FIG. 2) containing one or more of the battery cells 12C therein. As illustrated, the battery cells 12C define therein a respective battery cavity 38, which when part of the battery cell 12C may be filled with an electrolyte material (not shown). Electrode tabs (+, –) may extend from the battery cell 12C to facilitate electrical connection of the battery cell 12C to other battery cells 12C located within the battery system 12.

Each respective one of the battery cells 12C contemplated herein may define a respective vent opening 14 having a corresponding vent cover 140. The vent opening 14 of a given battery cell 12C is situated between the electrode tabs (+, –) in the non-limiting construction of FIGS. 3A and 3B. The battery cavity 38 is in fluid communication with the respective vent opening 14. As shown in FIG. 3B, the exhaust volume 34 defined by/between the battery cell 12C and the undersurface 350 of the battery cover 35 may in turn define an air gap 39 between the battery cover 35 and the battery module 12M/battery cell 12C. The air gap 39 is present between the undersurface 350 of the battery cover 35 and a corresponding distal end E1 of an angled and/or curved/contoured diverter body 150 of the diverter assembly 15 in this embodiment.

In accordance with the disclosure, each diverter assembly 15 is arranged relative to a respective vent opening 14. The diverter assembly 15, which includes one or more of the diverter bodies 15, is configured to move relative to the battery cell 12C, the battery cover 35, and/or the battery housing 12H (FIG. 1) in this particular embodiment. Movement of the diverter assembly 15, or more precisely the diverter body or bodies 150 thereof, occurs in response to the flow of ejecta (arrow GG) forcibly escaping through the vent opening 14. In some configurations, an insulating layer 37 forms a planar thermal barrier opposite the battery cells 12C. The diverter body 150 in such a construction may be arranged parallel to or coplanar with the insulation layer 37.

In response to a thermal propagation event occurring in one or more of the battery cells 12C, the diverter assembly 15 and its diverter body or bodies 150 are operable for diverting a resulting the flow of ejecta (arrow GG) into the exhaust volume 34. This occurs in a predetermined flow direction when the flow of ejecta (arrow GG) passes through the vent opening 14 as shown in FIG. 3B. In one or more embodiments, the predetermined flow direction may be a single direction as shown, e.g., right-to-left from the viewing perspective of FIG. 3B. While dividing the flow of ejecta (arrow GG) into two distinct streams may have benefits in other locations in the battery system 12, e.g., as described below with reference to FIG. 10, unidirectional diversion or deflection as shown in FIG. 3B may be used to reduce thermal stress on structure located directly opposite the vent opening 14, in this case the battery cover 35. To further reduce thermal stress, ambient air (arrow AA), e.g., captive air within the battery housing 21 or airflow directed through the battery system 12, may be entrained with the flow of ejecta (arrow GG) within the air gap 39 by the diverter assembly 15. Thus, the diverter body 150 may be configured to entrain the ambient air with the flow of ejecta (arrow GG).

To that end, one or more diverter bodies 150 may be arranged at a predetermined angle (θ) and/or curvature relative to a plane of the vent opening 14, such that each diverter body 150 is configured to entrain the ambient air with the flow of ejecta (arrow GG) within the air gap 39. The diverter body 150 may be flat as shown for simplicity or curved in different embodiments. An anchor 60 may be connected to the battery cell 12C, for instance, with the diverter body 150 connected to the anchor 60 by a revolute joint 61 such that the diverter body 150 rotates about an axis of the revolute joint 61 in response to forces imparted by the flow of ejecta (arrow GG). In a non-limiting embodiment, the predetermined angle (θ) may be about 25° to about 35°, with the illustrated angle of about 45° being a possible maximum. A curved surface may be used in lieu of a straight/flat angled embodiment of the diverter body 150. Larger angles would tend to direct the flow of ejecta (arrow GG) into the battery cover 35, while shallower angles may impede flow of the ejecta (arrow GG), thus producing more turbulent flow and a suboptimal venting response and stress distribution. Similarly, the diverter body 150 may be curved to provide a similar trajectory to the flow of ejecta (arrow GG).

In addition to the predetermined angle (θ) and/or curvature, the shape and material construction of the diverter body 150 may be selected to provide a desired level of performance during the thermal propagation event. For instance, a leading surface 40 of the diverter body 150, i.e., the particular surface that faces the vent opening 14, may be coated with a suitable thermal insulating material to protect the diverter body 150 during the thermal propagation event. As with the insulating layer 350 disposed on the battery cover 35, the leading surface 40 and possibly the entirety of the diverter body 150 may be constructed of or coated with mica or another application-suitable high-temperature material.

Still referring to FIGS. 3A and 3B, the diverter assembly 15 may include a support member 58 connected to a respective one of the battery cells 12C and a respective one diverter bodies 150 in this embodiment. For example, the support member 58 may include a pin-and-slot mechanisms 44 for each vent opening 14. Each pin-and-slot mechanism 44 has a respective arm 48 connected to a corresponding one of the battery cells 12C, with the arm 48 defining an elongated slot 49 therethrough. A pin 55 of the pin-and-slot mechanism 44 is connected to a corresponding one of the diverter bodies 150 as shown, and is configured to translate within the slot 49 when the corresponding one of the diverter bodies 150 moves in response to the flow of ejecta (arrow GG).

The support member 58 is configured to limit a range of motion and inclination of the respective one diverter bodies 150, e.g., by setting the arm 48 at a desired angle and locking it into place. The support member 58, which is connected to the diverter body 150 and is connectable to the battery cell 12C as shown, is arranged relative to a vent opening 14 of the battery cell 12C. In response to a thermal propagation event occurring in the battery cell 12C, the support member 58 may open to the predetermined angle (θ) relative to a plane of the vent opening 14 to divert the flow of ejecta (arrow GG) in a predetermined direction upon passing through the vent opening 14.

Figure 4:
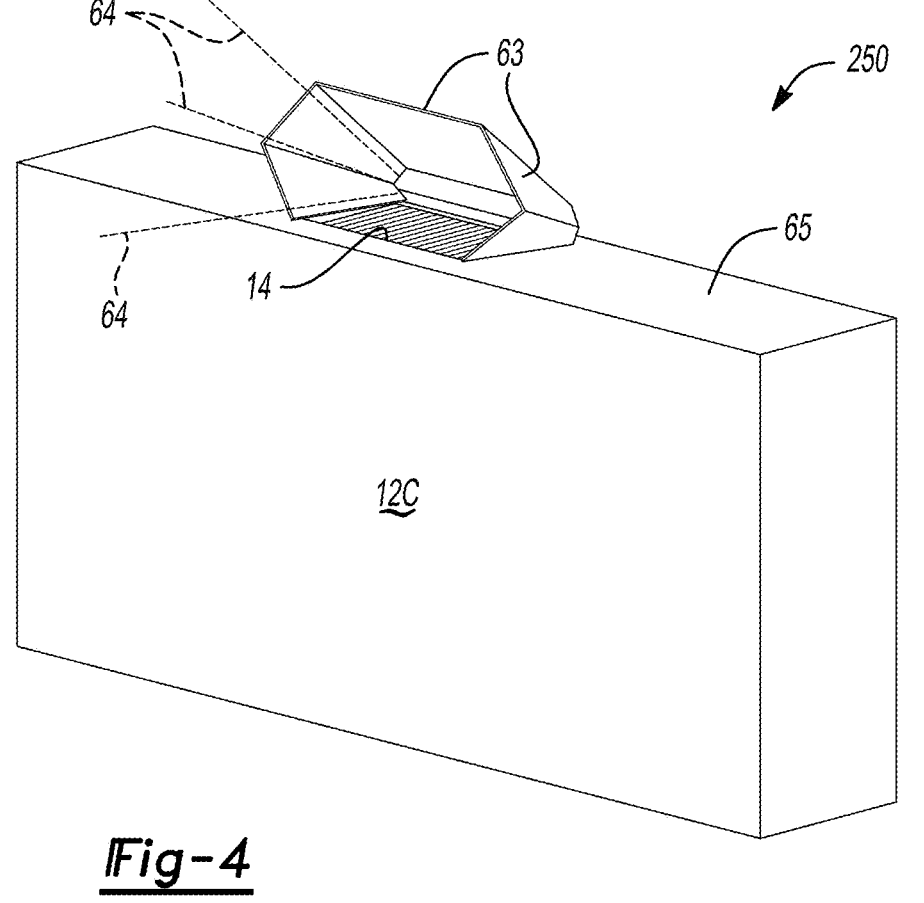
FIG. 4 is a perspective view illustration of a foldable diverter assembly according to an alternative construction.

Each of the one or more diverter bodies 150 used in the battery system 12 of FIG. 1 may be initially disposed proximate a respective vent opening 14 prior to the thermal propagation event. Thus, the one or more diverter bodies 150 form part of or work in concert with the particular vent cover 140 that seals the respective battery cavity 38, with an exemplary battery cell 12C illustrating a cell-level venting approach. Another integral approach may be implemented using alternatively constructed "foldable" diverter body 250 is shown in FIG. 4. In this representative embodiment, the diverter body 250 may be constructed of a single piece of thin foil or sheet metal, or from another application-suitable material. The diverter body 250 may then be welded, adhesively bonded, or otherwise securely joined to a cell cap 65 of the battery cell 12C. As with the other disclosed embodiments, the diverter body 250 may be constructed of a temperature-resistant material and/or coated with mica or another application-suitable material capable of temporarily withstanding the elevated temperature of the flow of ejecta (arrow GG) during the thermal propagation event.

A possible approach includes constructing the diverter body 250 of FIG. 4 from multiple foldable sides 63, with the sides 63 being purposefully folded along predefined fold lines 64 to flatten the diverter body 250 into a pre-thermal propagation event state. The diverter body 250 is thus analogous to an "origami-style" folding vent. Diverter bodies 250 constructed in this manner have a normally-closed position configured to cover and seal the vent opening 14 prior to the thermal propagation event, with the diverter body 250 being separate from or integrated with the vent cover 140. The diverter body 250 also has an open position as shown that is configured to selectively uncover the respective vent opening 14 during the thermal propagation event.

When the battery cell 12C is functioning properly in the absence of a thermal propagation event, the diverter body 250 remains substantially flat. While the diverter body 250 may be used as the vent cover 140 as noted above, thus reducing part count, it is also possible to use the diverter body 250 as a secondary cover disposed over the vent cover 140. When an internal seal securing the diverter body 250 to the cell cap 65 fails during the thermal propagation event due to heat and the resulting high internal pressure within the battery cavity 38, the diverter body 250 of FIG. 4 "pops open" and thereafter unfolds into a desired final shape and angular orientation. Such a shape and orientation are determined beforehand by the fold lines 64, which in one or more embodiments are configured to deploy the diverter body 250 to the predetermined angle ($\theta$) noted above.

Figure 5A:
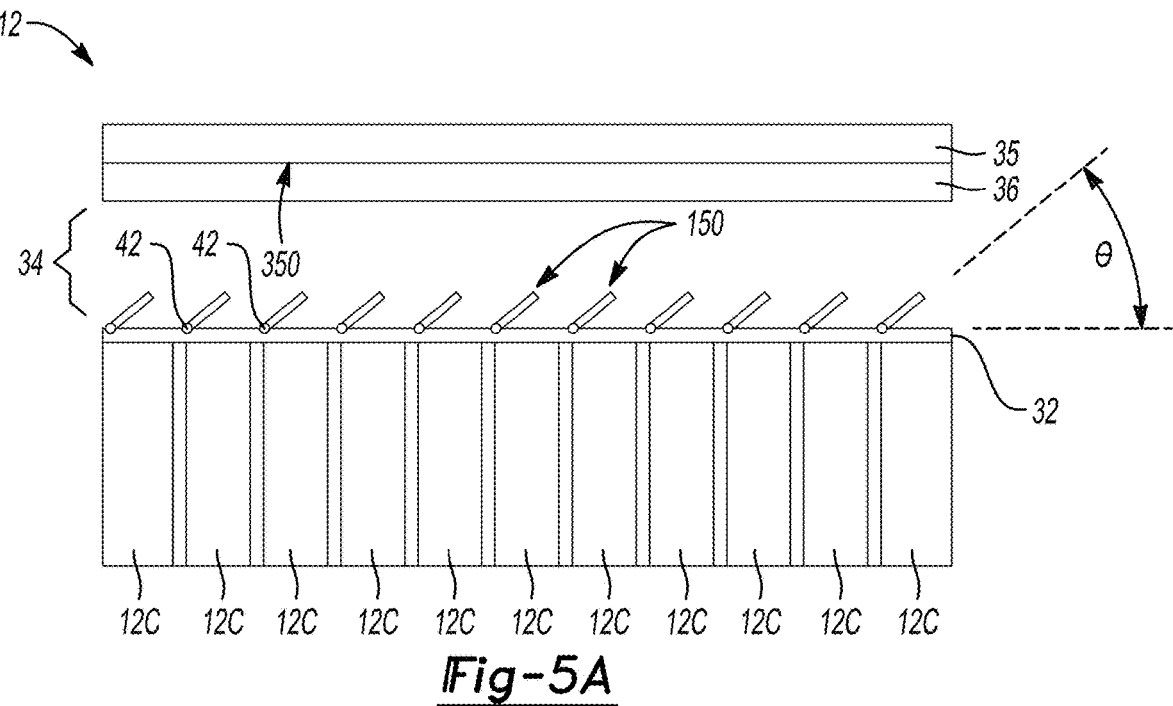
FIGS. 5A and 5B are side view illustrations of an optional normally-open cascaded configuration of the diverter assembly usable with the battery system of FIG. 1.
Figure 5B:
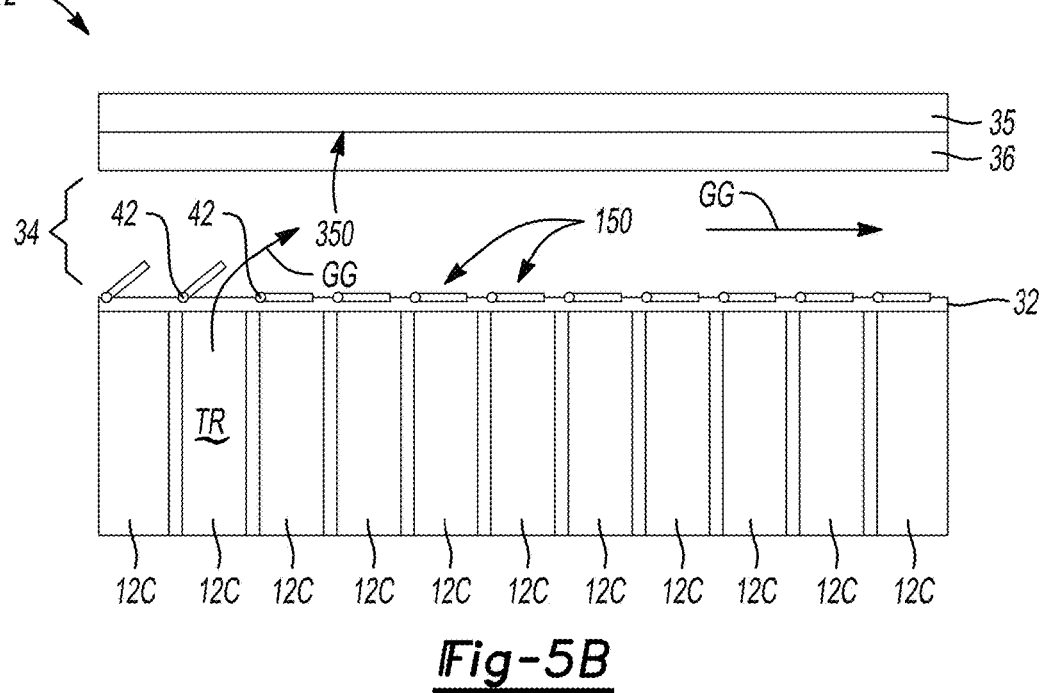

Referring now to FIGS. 5A and 5B, venting control may operate at the level of the battery module 12M of FIG. 2, i.e., with diverter bodies 150 attached to respective battery cells 12C and configured to work together to expel the flow of ejecta (arrow GG) in a particular venting direction. Such solutions may include connecting the interconnect board 32, e.g., a cell sense board as appreciated in the art, to a plurality of the diverter bodies 150. Each of the diverter bodies 150 may be initially secured in a static position. In this representative approach, the battery cell 12C defines a respective vent opening 14, and therefore the diverter bodies 150 are initially arranged at the same predetermined angle ($\theta$) relative to the shared plane of the vent openings 14. In this instance, the diverter bodies 150 are also arranged at the predetermined angle ($\theta$) relative to the plane of the interconnect board 32.

The diverter bodies 150 in the embodiment of FIGS. 5A and 5B have a normally-open position relative to the respective vent opening 14 prior to the thermal propagation event. The normally-open position corresponds to the predetermined angle ($\theta$), e.g., about 25° to about 45°. Each of the one or more diverter bodies 150 is configured to close the respective vent opening 14 in response to the flow of ejecta (arrow GG) escaping from one or more of the battery cells 12C. In other words, the solution of FIGS. 5A and 5B results in a cascading "domino" effect as the flow of ejecta (arrow GG) flows across the battery cells 12C located downstream, melting the corresponding adhesive material 42 and pressing the diverter bodies 150 securely against the vent openings 14.

To ensure the diverter bodies 150 of a thermal propagation battery cell 20C do not open to an angle exceeding the predetermined angle ($\theta$) during a thermal propagation event, the ICB 40 may be formed with or connected to a stop feature (not shown) such as a lip, wall, or projection of the ICB 40 that limits rotation of the diverter body 150. Additionally, the diverter bodies 150 may be lightly spring loaded to ensure that the diverter bodies 150 close properly in response to the exhaust flow (arrow FF), i.e., with a coil spring (not shown) connected to the ICB 40 proximate the adhesive materials 42 and having a spring force that is less than the pressure of the exhaust flow (arrow FF).

In a possible implementation, each of the one or more diverter bodies 150 is maintained at the predetermined angle ($\theta$) prior to the thermal propagation event using an adhesive material 42. The adhesive material 42 is configured to melt in the presence of the flow of ejecta (arrow GG) initially passing from a battery cell 12C experiencing thermal propagation, e.g., at about 1000° C. as noted above, to thereby cause each diverter body 150 to close a respective vent opening 14 as shown in FIG. 5B. The flow of ejecta (arrow GG) thereafter passes over remaining battery cells 12C whose interiors are protected by the now-closed diverter bodies 150. As the cell vent openings 14, and in particular their corresponding cell vent covers 140, are typically protected by mica or another suitable thermal insulating material, the non-limiting exemplary configuration of FIGS. 5A and 5B may eliminate the need for such insulating material in the structure of the vent openings 14/vent covers 140, instead integrating the insulating material into the diverter assembly 15. Likewise, incorporating thermal insulation into the diverter assembly 15 may enable reduction in the thickness of the insulating layer 36 of the battery cover 35.

Figures 6, 7A, 7B, 7C:
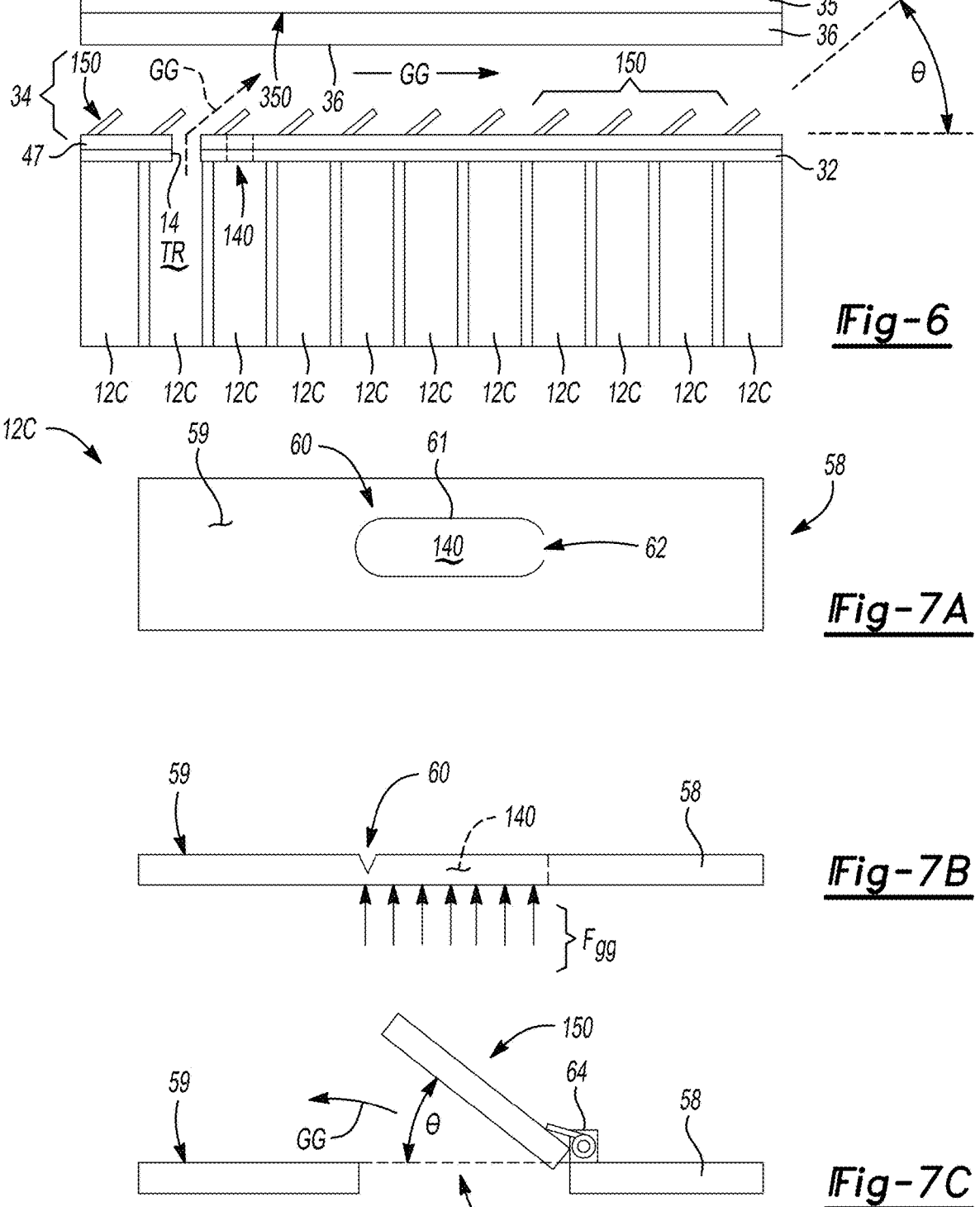
FIG. 6 is a side view illustration of another normally-open construction of the diverter assembly disclosed herein.
FIGS. 7A, 7B, and 7C collectively illustrate a notched surface construction for forming a diverter assembly from a battery cell lid in a manner that enables the diverter assembly to simultaneously function as a vent cover.

Referring briefly to FIG. 6, the diverter assembly 15 having the normally-open configuration of FIGS. 5A and 5B, i.e., a configuration in which the diverter assembly 15 closes in response to a thermal propagation event, may be alternatively constructed from a monolithic plate 47. The plate 47 may be embodied as a stamped steel plate or a plate of another application-suitable construction such as a composite material, with the above-noted interconnect board 32 possibly connected to the plate 47. The plate 47 in this embodiment defines a plurality of the diverter bodies 150. In such a construction, the diverter bodies 150 may be fixed to the battery cells 12C, such that the diverter bodies 150 do not move before or during the thermal propagation event.

The vent covers 140 in the form of burst membranes, the location of one of which is shown in FIG. 6 for illustrative simplicity, may be situated between the plate 47 and the interconnect board 32. A thin sheet of mica (not shown) may also be disposed at this location. Each vent cover 140 (and overlapping or contiguous portions of the mica sheet) is configured to independently fail in response to a threshold pressure differential. During a thermal propagation event, therefore, material of the vent covers 140 of a given battery cell 12C experiencing thermal propagation may be ejected into the exhaust manifold or obliterated. The flow of ejecta (arrow GG) thereafter passes over remaining battery cells 12C. However, due to the intact vent covers 140 and the orientation of the diverter bodies 150, downstream battery cells 12C are protected from ingress of the flow of ejecta (arrow GG).

FIGS. 7A, 7B, and 7C collectively illustrate yet another approach to implementing the present divert assembly 15 in a manner in which the diverter body 150 is integral with the vent cover 140. The battery cell 12C of FIG. 2 may be optionally constructed as a prismatic cell as noted above, and thus equipped with a cell lid 58 having an external surface 59. The cell lid 58 may be constructed separately from or as an integral part of a cell housing or outer can (not shown), e.g., a protective enclosure constructed of stainless steel, nickel-plated mild steel, aluminum, or another application suitable material.

As shown in FIG. 7A, the external surface 59 may be scored, partially cut, or "notched" from the outside along a perimeter 60 of the diverter body 150 to enable the diverter body 150 to bend relative to the external surface 59 to form the vent cover 140 in response to the flow of ejecta (arrow GG). A surface area 61 of the vent cover 140/diverter body 150 is thus defined by the perimeter 60, with the perimeter 60 being coextensive with most of the vent opening 14, with the exception of a small unnotched area 62 that remains at one end of the vent opening 140/diverter body 150. In a possible implementation, the perimeter 60 may be about 95% to about 99% coextensive with a perimeter of the corresponding vent opening 140.

Referring to FIGS. 7B and 7C, the material forming the unnotched area 62 is sufficient for bending in response to pressure (arrows $F_{gg}$) building up within the battery cell 12C and resulting in the flow of ejecta (arrow GG of FIG. 7B). Bending occurs due to stress concentration along the notch-defined perimeter 60, without breaking the unnotched area 62. Because the surface area 61 defines corresponding surface area of a respective one of the diverter bodies 150, the diverter bodies 150 in the embodiment of FIGS. 7A-7C form a respective vent cap 140 configured to open during a thermal propagation event. Thus, stress concentration at or along the perimeter 60 will cause the diverter body 150 to pivot to the predetermined angle (θ) of FIG. 7C, much like a door that swings open on its hinges. A stopper mechanism 64, e.g., a range-limiting hinge, protrusion, or protuberance that is formed with or connected to the external surface 59, may be used to limit the rotation of the diverter body 150/vent cover 140 to the predetermined angle (θ). The diverter body 150 and the vent cover 140 are thus integrated into a single component in this non-limiting implementation.

Figure 8A:
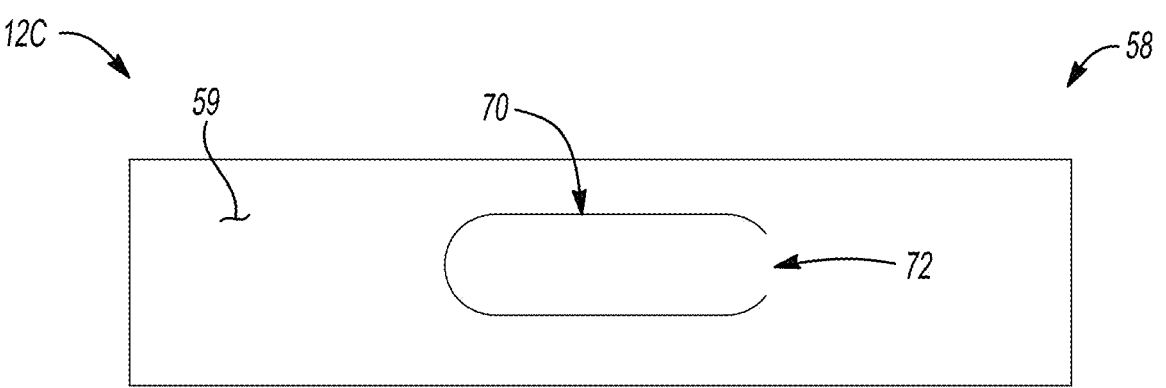
FIGS. 8A, 8B, 8C, and 8D collectively illustrate a process for constructing the diverter assembly and connecting a vent cover thereto in accordance with an aspect of the disclosure.
Figure 8B:
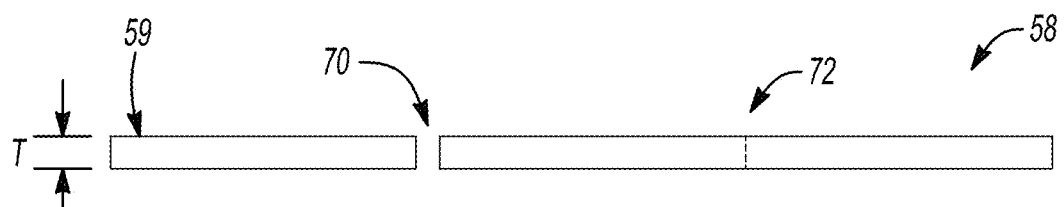

As illustrated in FIGS. 8A-8D, a similar approach may be used to construct a diverter assembly 15 while retaining the vent cover 140 as a separate component, i.e., one that is not integrally formed with the diverter assembly 15 as in FIGS. 7A-7C. Such a vent cover 140 could be welded around its periphery to the cell lid 58 in this representative embodiment. As with the embodiment of FIGS. 7A-7C, the battery cell 12C may be optionally constructed as a prismatic cell equipped with the cell lid 58, with the cell lid 58 having the external surface 59. Unlike the notching approach of FIGS. 7A-7C, however, the partial perimeter 60 may be cut through a thickness (T) of the cell lid 58 as shown in FIGS. 8A and 8B, thus leaving an uncut area 72 that is analogous to the unnotched area 62 of FIG. 7A.

Figure 8C:
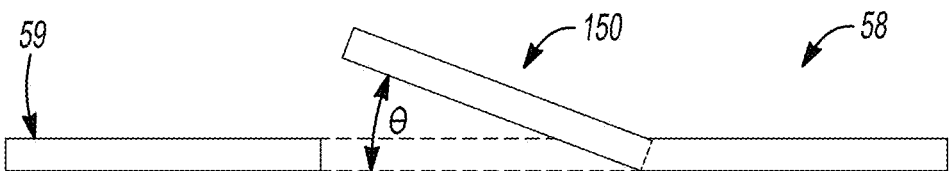
Figure 8D:
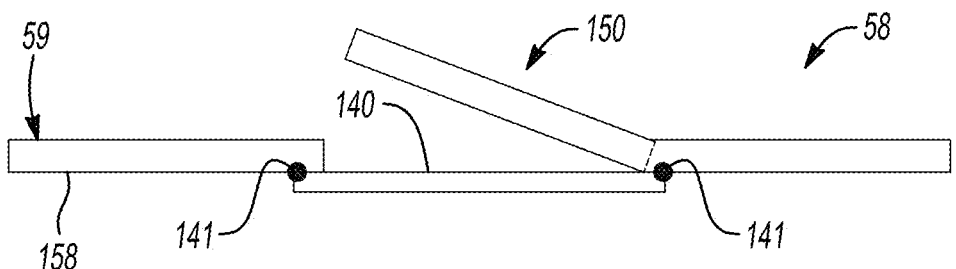

To form the diverter assembly 15 in this alternative manner, one may laser cut, punch, or otherwise form the partial perimeter 60 of FIG. 8A, for instance using a punch, cutting tool, or laser. As shown in FIG. 8B, doing so will leave the uncut area 72 at one end of the diverter body 150. In an additional step, the diverter body 15 may be bent at the uncut area 72 to the predetermined angle (θ) as illustrated in FIG. 8C. Thereafter, a periphery of the vent cover 140 may be welded to a surface 158 of the cell lid 58 around the diverter body 150, e.g., via welded seams or spots 141, such that the diverter body 150 is oriented to divert the flow of ejecta (arrow GG) passing through the vent opening 14 during a thermal propagation event. The representative embodiment of FIGS. 8A-8D therefore enables construction of a welded vent plate with a built-in diverter body 150 arranged at the predetermined angle (θ). As the predetermined angle (θ) is established before occurrence of the thermal propagation event, the stopper mechanism 64 of FIG. 7D may be excluded from this construction, although the stopper mechanism 64 may be included in other embodiments.

Figure 9:
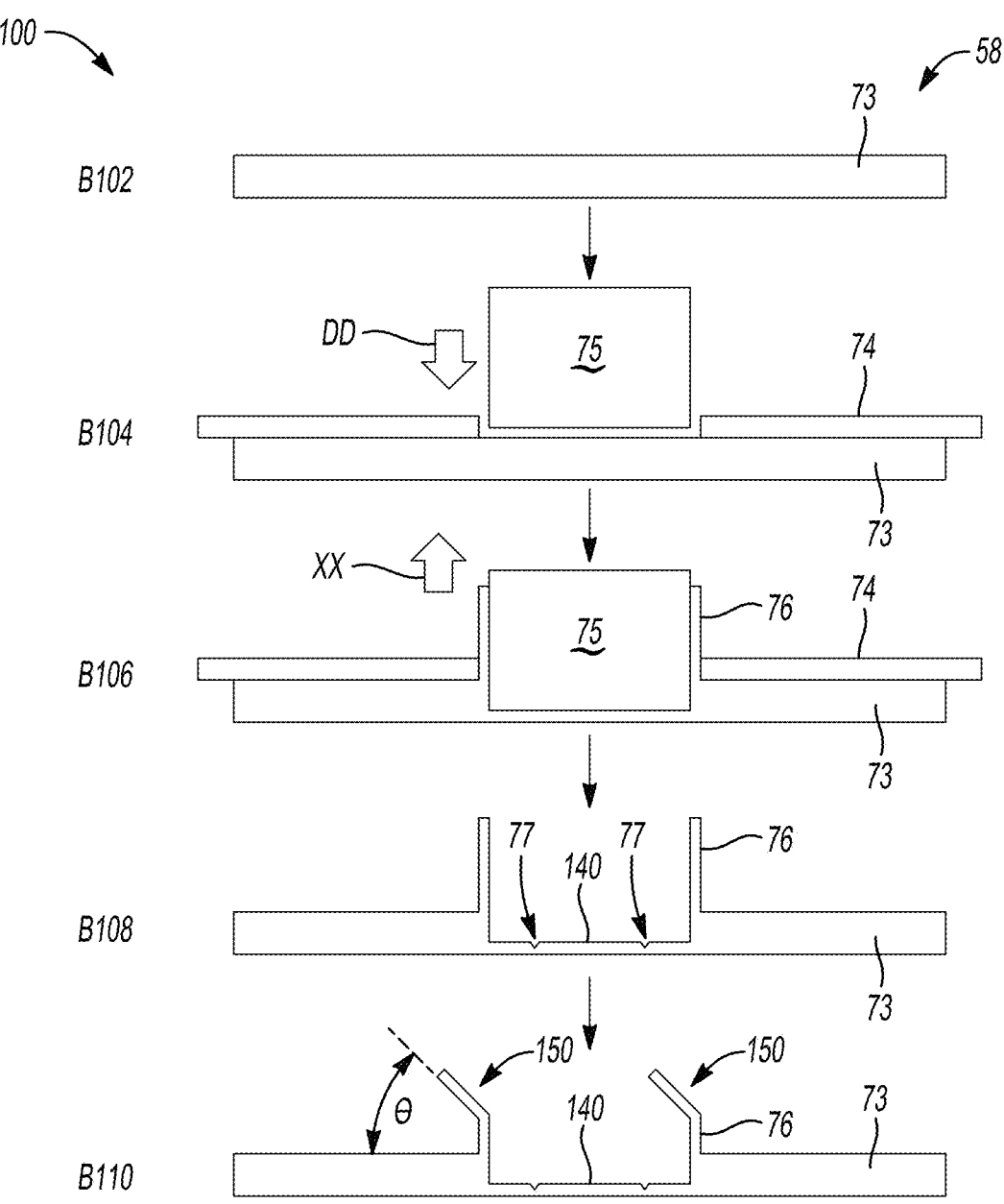
FIG. 9 is a flow diagram illustrating an extrusion-based process for constructing an integrated diverter assembly and vent cover using an alternative approach.

Referring now to FIG. 9, the diverter assembly 15 may be constructed via a method 100 in yet another construction. For simplicity, each logical step or subprocess of the method 100 is referred to as a method or process block. The cell lid 58 of FIGS. 7A-8D in this instance may start out at block B102 as a flat metal plate 73, e.g., of stainless steel, nickel-plated steel, aluminum, or another extrudable material. At block B104, the metal plate 73 may be placed in a die 74. An extrusion punch 75 is then forced against the metal plate 73 as indicated by arrow DD. Then, at block B106, material of the metal plate 73 surrounding the extrusion punch 75 will extend from the external surface 59 to form lip-like protrusions 76, a result of the plastic flow of metal from the extrusion-thinned area of the metal plate 73. The extrusion punch 75 is then extracted in the direction of arrow XX.

Continuing to block B108, the extrusion punch 75 is extracted, thus leaving the protrusions 76 as radial extensions from the external surface 59. Using the extrusion punch 75 or separately via another step, notches 77 may be formed in the metal plate 73 to define a vent cover 140 from a thinned perimeter of a vent opening 14. For a rectangular vent area of about 25 mm×10 mm, the height of the resulting protrusions 76 may be about 25 mm for a 0.5 mm die clearance in a non-limiting embodiment. This will allow sufficient space for subsequent bending of the protrusions 76 to the predetermined angle (θ) in block B110 when forming a corresponding diverter body 150. A hollow tube or chimney is thus formed between adjacent diverter bodies 150 in this particular configuration.

Figure 10:
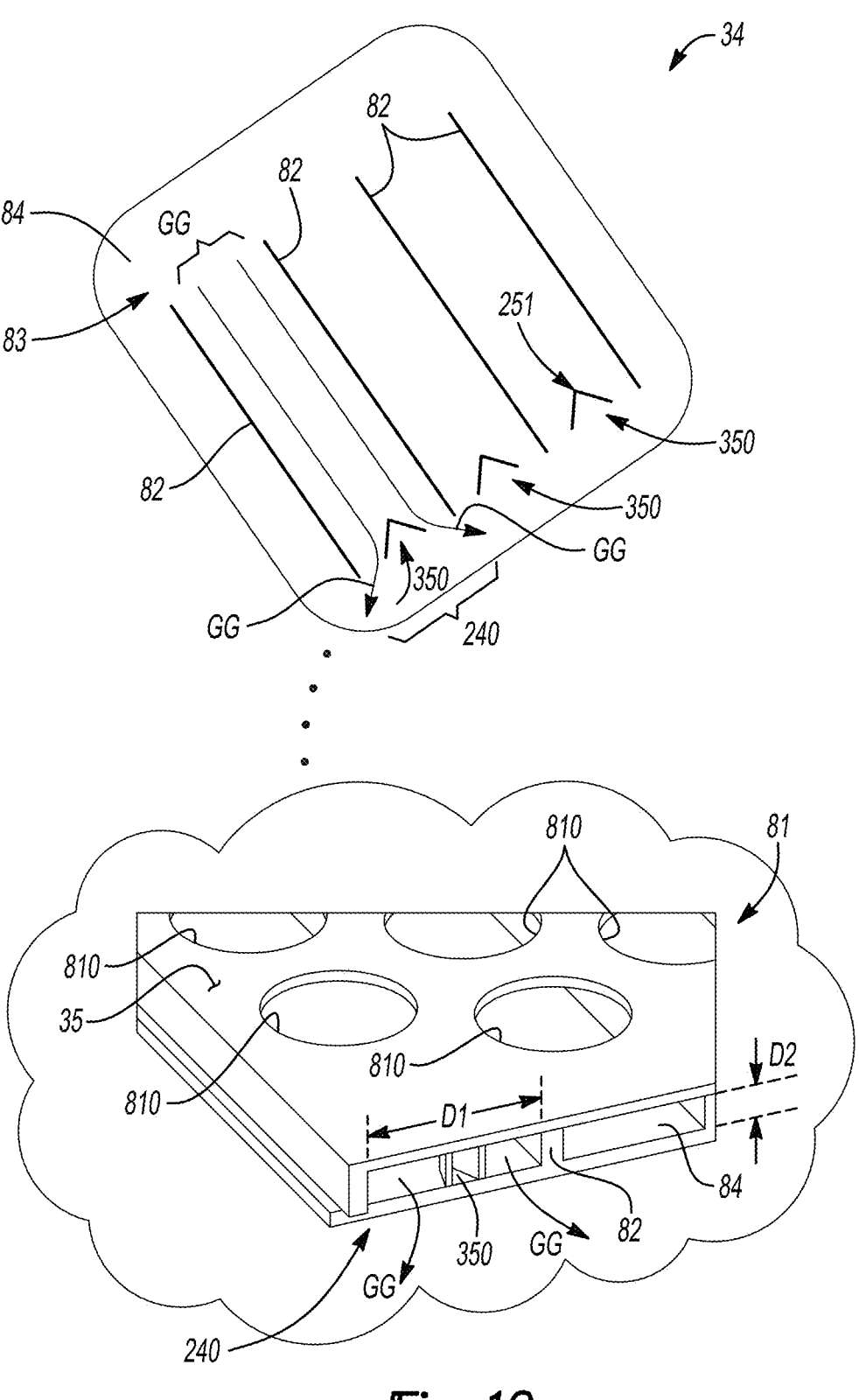
FIG. 10 illustrates an extension of the present teachings to a battery module exhaust opening.

Referring to FIG. 10, the above-described concepts for constructing the diverter assembly 15 may also be applied to vents located at other orientations and/or at different locations within the battery system 12 of FIG. 1. For instance, an embodiment of the exhaust volume 34 noted above may use the battery cover 35 to enclose a plurality of the battery cells 12C (see FIGS. 1-3B). The battery cover 35 may include a tray assembly 81 that defines a plurality of tray openings 810 adjacent to a corresponding vent cover 140 of a given battery cell 12C as described above. When the vent cover 140 opens in response to a thermal propagation event, the flow of ejecta (arrow GG) passes through the vent opening 14 (not shown) and the tray opening 810.

In a possible module-level venting implementation, the battery cover 35 may include channel walls 82 that define the vent channel 83 through which the flow of ejecta (arrow GG) will pass on its way to a module vent opening 240. In one or more embodiments, the space between the battery cover 35 and the tray assembly 81 may define portions of the exhaust volume 34 as noted above, with the module vent opening 240 possibly arranged as an exit port of the exhaust volume 34.

During a thermal propagation event, the flow of ejecta (arrow GG) passes into the vent channel 83. Once in the vent channel 83, the flow of ejecta (arrow GG) flows relative to a tray floor 84 towards a wedge-shaped diverter body 350 disposed in the module vent opening 240. In this instance, the wedge-shaped diverter body 350 is disposed along a major dimension (D1) of the rectangular-shaped module vent opening 240, with an apex 251 of the wedge-shaped diverter body 250 facing the flow of ejecta (arrow GG). The shape of the diverter body 250 thus divides the flow of ejecta (arrow GG) and directs each resulting flow component in a desired direction relative to the vent channel 83. The wedge-shaped diverter body 250 in other implementations may be disposed along the minor dimension (D2) of the vent channel 83 to entrain ambient air in a different direction.

Figures 11A, 11B:
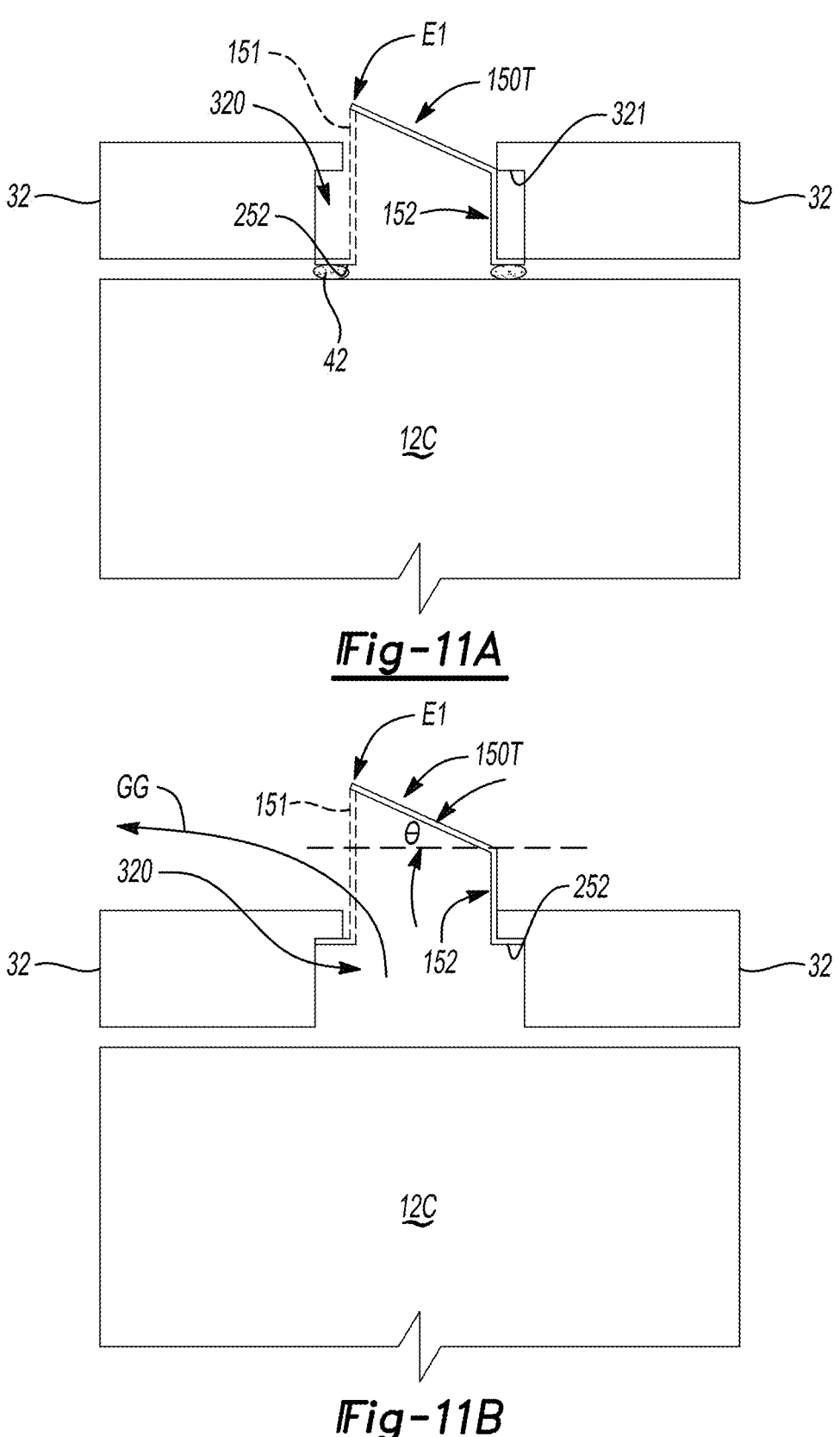
FIGS. 11A and 11B illustrate a battery cell with a translatable diverter body in accordance with another aspect of the disclosure.

FIGS. 11A and 11B illustrate yet another embodiment of the diverter assembly 15 described above. In this case, the divert assembly 15 includes a diverter body 150T having an integrated straight section 152, which may enable formation of a diverter assembly 15 for wider vent openings 14. The diverter body 150T is translatable with respect to the battery cell 12C such that the diverter body 150T may telescope or slide into place during a thermal propagation event. That is, the diverter body 150T is configured to translate along a center axis 14X of the vent opening 14 in response to the flow of ejecta (arrow GG) as shown in FIG. 11B. In a pre-thermal propagation state as shown in FIG. 11A, the diverter body 150T may be positioned relative to the vent cover 140 and secured in place, e.g., via meltable adhesive 42 similar to the implementation of FIGS. 5A and 5B, or via friction fit, detents, etc.

The predetermined angle (θ) is formed by the diverter body 150T consistently with prior described embodiments. In this example, the interconnect board 32 may define a recess 320 having an inner wall 321. The diverter body 150T is disposed within the recess 320 and surrounds the vent cover 140. The battery cell 12C is thus sealed under normal conditions, with the diverter body 150T positioned above the vent cover 140 and canted at the predetermined angle (θ).

During a thermal propagation event as shown in FIG. 11B, the heat from the escaping flow of ejecta (arrow GG) melts the adhesive material 42 and forces the diverter body 150T away from the vent opening 14. The diverter body 150T translates in the direction of arrows TT until the diverter body 150T contacts the inner wall 321. The inner wall 321 thus limits further motion of the diverter body 15T, leaving a free path from the flow of ejecta (arrow GG) to escape from the battery cell 12C. In the open position of FIG. 11B, the diverter body 150T is provided with an additional height (H1) above the interconnect board 32, and a total height (H2) above the battery cell 12C. In one or more embodiments, the total height (H2) may equal a width (W) of the cell opening 14, with the height (H1) and the height (H2) limiting flow restriction and decrease exit velocity of the ejecta (arrow GG).

The solutions set forth above thus enable the construction of the battery system 12 of FIG. 1 having a diverter assembly 15 which redirects the flow of ejecta (arrow GG) in a predetermined and purposeful direction during a thermal propagation event. Use of the diverter assembly 15 in its various constructions enables deflection of the flow of ejecta (arrow GG) away from temperature-sensitive structure to help lower the resulting temperature thereof, e.g., the battery cover 35 of FIGS. 3A and 3B or other structure. Temperature reduction in this manner is enhanced by entrainment of relatively cold ambient air with the elevated temperature of the flow of ejecta (arrow GG) as illustrated in FIGS. 3B, for instance, with various fixed or movable options disclosed herein, and with the latter possible implemented as rotatable, pivotable, or translatable constructions.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A battery system comprising:
a battery housing having a battery cover;
one or more battery cells, each respective one of the battery cells defining a corresponding vent opening and a corresponding battery cavity in fluid communication therewith, wherein an exhaust volume is at least partially defined by the battery system in proximity to the one or more battery cells;
a diverter assembly arranged relative to the vent opening, the diverter assembly having a diverter body that is configured, in response to a thermal propagation event occurring in the battery module and/or at least one of the one or more battery cells, to divert a flow of ejecta from the battery cavity into the exhaust volume in a predetermined flow direction when the flow of ejecta passes through the corresponding vent opening; and
an insulation layer forming a planar thermal barrier opposite the one or more battery cells, wherein the diverter body is arranged parallel to or coplanar with the insulation layer.

2. The battery system of claim 1, wherein the battery module includes a module vent opening as the corresponding vent opening, and wherein the diverter body is disposed in the module vent opening.

3. The battery system of claim 1, wherein an air gap is defined between the battery cover and the diverter body, and wherein the diverter body is arranged at a predetermined angle and/or curvature relative to a plane of the corresponding vent opening such that the diverter body is configured to entrain ambient air with the flow of ejecta within the air gap.

4. The battery system of claim 3, wherein the diverter assembly includes a plate connected to one or more protrusions, and wherein a distal end of the one or more protrusions is bent and/or shaped to the predetermined angle and/or curvature to form the diverter body.

5. The battery system of claim 3, wherein the diverter body has a normally-open position relative to the corresponding vent opening prior to the thermal propagation event, the normally-open position corresponding to the predetermined angle and/or curvature, and the diverter body is configured to close the corresponding vent opening in response to the flow of ejecta during the thermal propagation event.

6. The battery system of claim 5, wherein:
the predetermined angle and/or curvature includes the predetermined angle;
the diverter body is maintained at the predetermined angle prior to the thermal propagation event using an adhesive material; and
the adhesive material is configured to melt due to a temperature of the flow of ejecta to cause the diverter body to close the corresponding vent opening.

7. The battery system of claim 1, wherein the diverter body is configured to move relative to the battery housing in response to the flow of ejecta passing through the vent opening.

8. The battery system of claim 7, further comprising:
a support member connected to the diverter assembly, the support member including a plurality of pin-and-slot mechanisms each having:
an arm connected to a corresponding one of the battery cells, the arm defining a slot;
a pin connected to the diverter body and configured to translate within the slot when the diverter body moves in response to the flow of ejecta; and
a hinge connected to the corresponding one of the battery cells and the diverter body, the hinge and slot together being configured to limit a range of motion of the diverter body.

9. The battery system of claim 1, wherein the diverter body is disposed within the vent opening, such that the diverter body forms a vent cover that seals the vent opening.

10. The battery system of claim 1, wherein the diverter body includes foldable sides, such that the diverter body includes (i) a normally-closed position configured to cover and seal the vent opening prior to the thermal propagation event, and (ii) an open position configured to selectively uncover the vent opening during the thermal propagation event.

11. The battery system of claim 1, wherein the diverter assembly is configured to translate along a center axis of the vent opening in response to the flow of ejecta.

12. The battery system of claim 1, further comprising:
a cell lid attached to each respective one of the battery cells, wherein an external surface of the cell lid is notched along a perimeter of the diverter body, and wherein the diverter body is configured to bend relative to the external surface of the cell lid to form a vent cover in response to the flow of ejecta.

13. The battery system of claim 1, wherein the diverter assembly is constructed from a plate defining the diverter body as a plurality of diverter bodies, and the plurality of diverter bodies are fixed relative to the one or more battery cells.

14. The battery system of claim 1, wherein the battery system includes a propulsion battery pack configured for use aboard a motor vehicle, the propulsion battery pack including the one or more battery cells.

15. A diverter assembly for a battery cell of a battery system, the diverter assembly comprising:

an insulation layer forming a planar thermal barrier opposite the battery cell;
a diverter body arranged parallel to or coplanar with the insulation layer; and
a support member connected to the diverter body and connectable to the battery cell, wherein the diverter body is configured to be arranged relative to a corresponding vent opening of the battery cell, and in response to a thermal propagation event occurring in the battery cell, to open to a predetermined angle of about 25° to about 45° relative to a plane of the corresponding vent opening to thereby divert a flow of ejecta from the battery cell into an exhaust volume of the battery system in a predetermined direction when the flow of ejecta passes through the corresponding vent opening.

16. The diverter assembly of claim 15, wherein the support member includes:
a pin-and-slot mechanism having an arm connected to the battery cell, the arm defining a slot, wherein a pin of the pin-and-slot mechanism is connected to the diverter body and is configured to translate within the slot when the diverter body moves relative to the battery cell in response to the flow of ejecta; and
a hinge connectable to the battery cell and connected to the diverter body, the hinge and slot being configured to limit a range of motion of the diverter body.

17. The diverter assembly of claim 15, the diverter body has a normally-open position in which the diverter body is arranged at the predetermined angle prior to the thermal propagation event, and a closed position that closes the corresponding vent opening in response to the flow of ejecta during the thermal propagation event.

18. A motor vehicle comprising:
a vehicle body;
a set of road wheels connected to the vehicle body; and
an electrified powertrain system including:
an electric traction motor connected to one or more of the road wheels;
a propulsion battery pack; and
an inverter circuit having an alternating current side connected to the electric traction motor and a direct current side connected to the propulsion battery pack, wherein the propulsion battery pack comprises:
a battery housing;
a plurality of battery cells, each respective one of the plurality of battery cells defining a corresponding vent opening and a corresponding cell cavity, wherein an exhaust volume is defined between the battery housing and the plurality of battery cells;
an insulation layer forming a planar thermal barrier opposite the plurality of battery cells; and
a diverter assembly arranged relative to the corresponding vent opening and including a diverter body, wherein the diverter body is arranged parallel to or coplanar with the insulation layer, and wherein the diverter body is configured, in response to a thermal propagation event occurring in at least one of the plurality of battery cells, to divert a flow of ejecta from the at least one of the plurality of battery cells into the exhaust volume in a predetermined direction when the flow of ejecta passes through the vent opening.

19. The motor vehicle of claim 18, further comprising:
one or more battery modules each containing the plurality of battery cells, wherein each of the battery modules includes a module vent opening as the corresponding vent opening, and wherein the diverter body is disposed in the module vent opening.

20. The motor vehicle of claim 18, wherein an air gap is defined between a battery cover of the battery housing and the diverter body, and wherein the diverter body is arranged at a predetermined angle and/or curvature relative to a plane of the corresponding vent opening such that the diverter body is configured to entrain ambient air with the flow of ejecta within the air gap.

* * * * *